Nov. 10, 1942.    R. F. HLAVATY    2,301,542
SELF-ALIGNING PULLEY
Filed Sept. 15, 1941    3 Sheets-Sheet 1
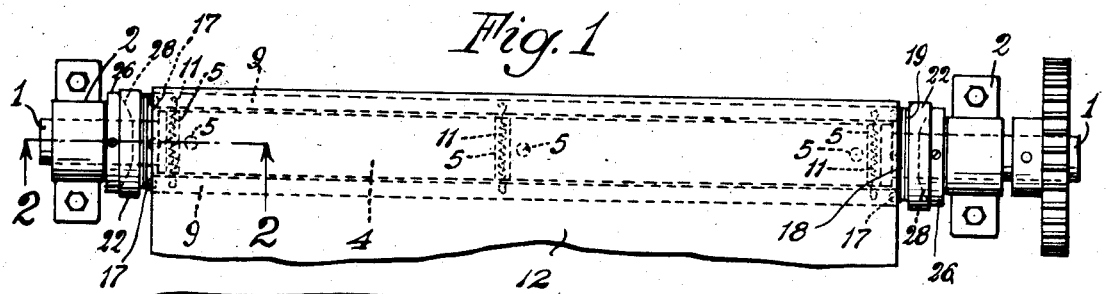
Fig. 1
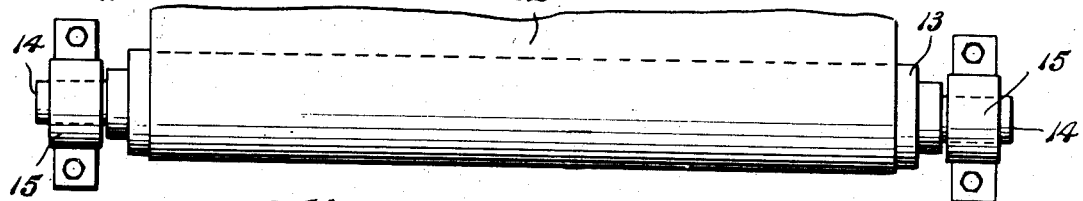
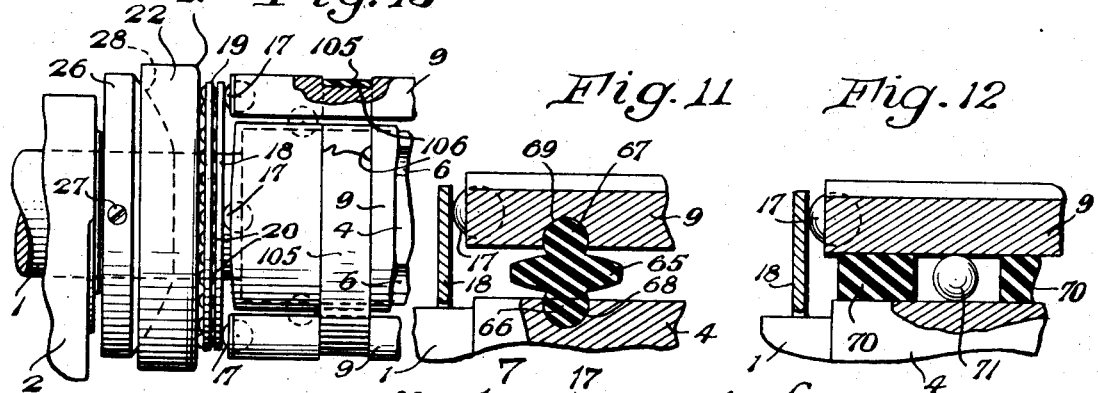
Fig. 13    Fig. 11    Fig. 12
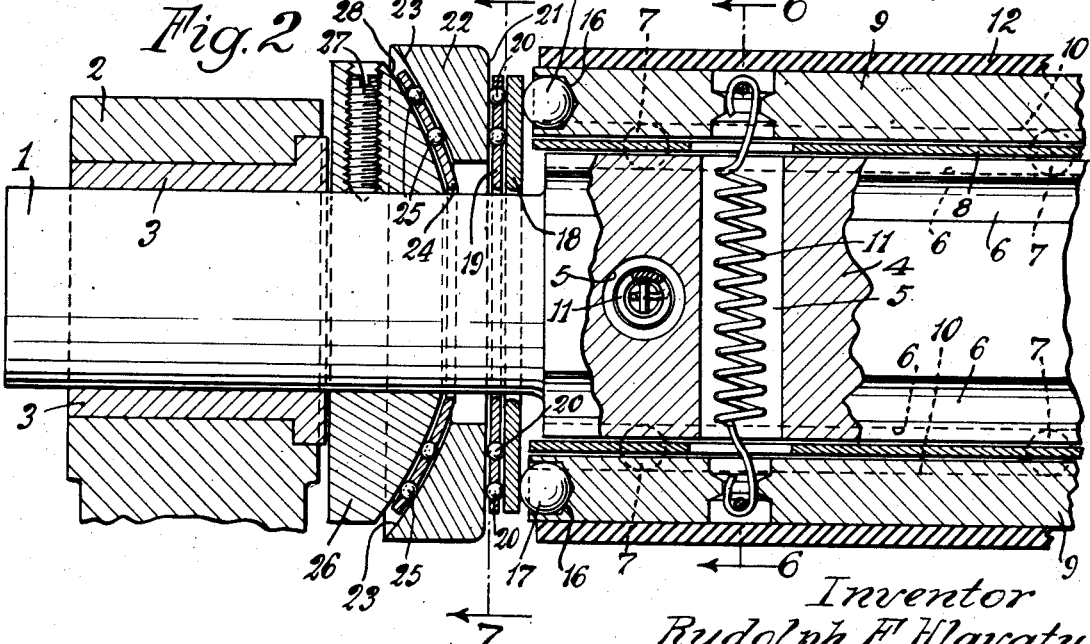
Fig. 2
Inventor
Rudolph F. Hlavaty
by Parker & Carter
Attorneys

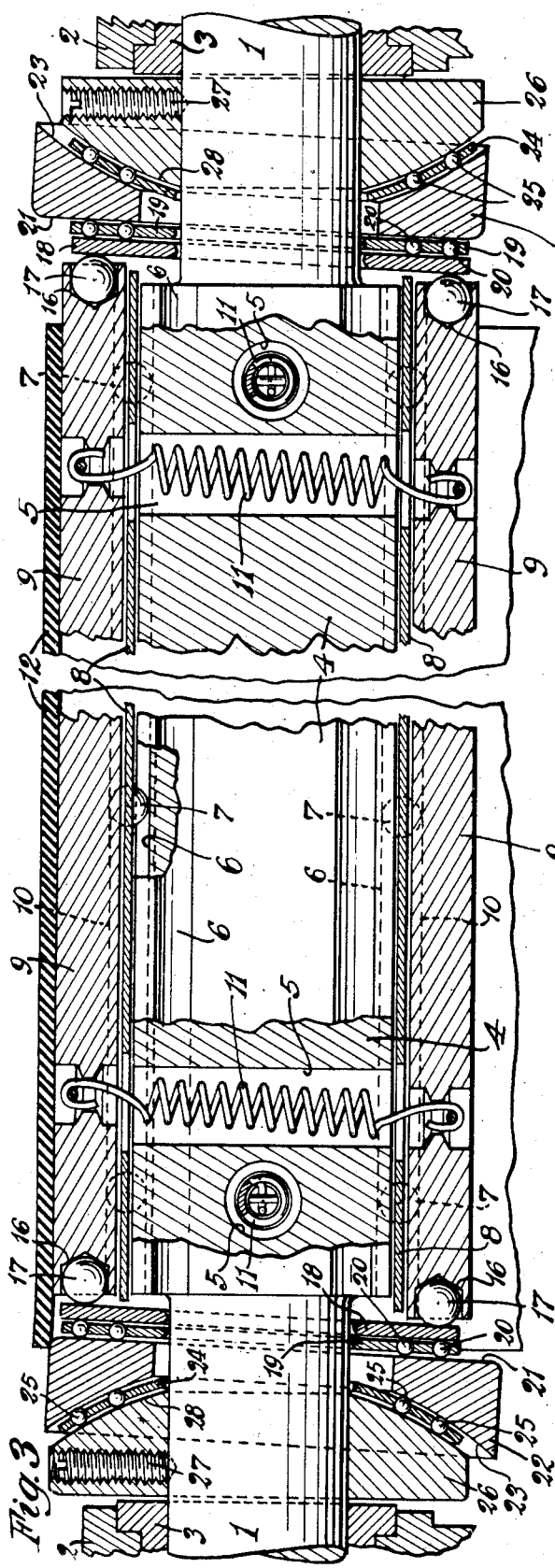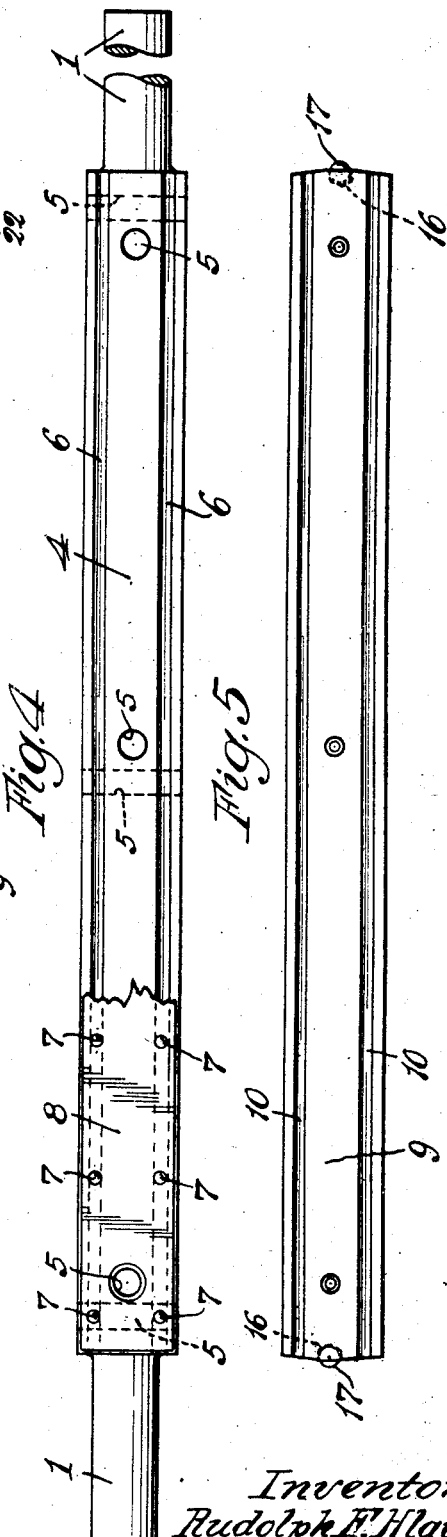

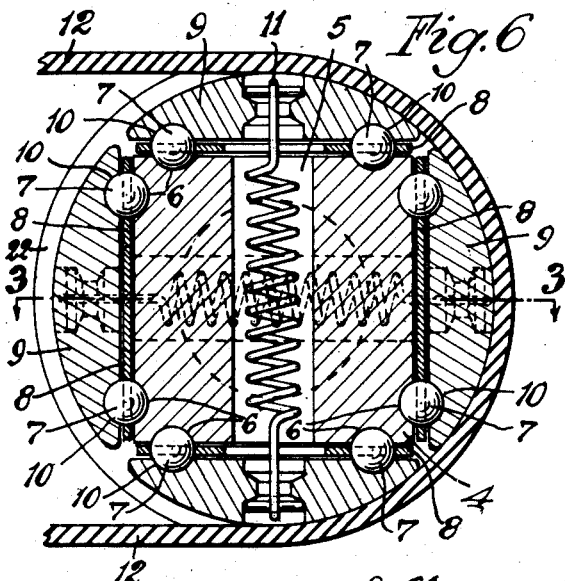

Patented Nov. 10, 1942

2,301,542

UNITED STATES PATENT OFFICE 2,301,542

SELF-ALIGNING PULLEY

Rudolph F. Hlavaty, Cicero, Ill.

Application September 15, 1941, Serial No. 410,871

29 Claims. (Cl. 74—241)

This invention relates to a self-aligning cylinder, wheel, roller, or other rotary member, either driving, driven, or idling. In one form it may be embodied in a pulley. It has for one object to provide a rotary member which has formed in it or adapted to it parts which operate automatically to keep it in alignment or to re-align it. Where the invention comprises a pulley operating with a belt, it serves to keep the belt and pulley aligned or to restore them to alignment.

It is well recognized that most belts and particularly wide or large belts have a tendency to move out of alignment. This tendency is particularly evident in the case of large rubber belts. Almost all belts are susceptible to change due to changing atmospheric and temperature conditions, and it is generally recognized that it is difficult to maintain such belts in alignment. In general practice, hand operated means are provided for re-aligning such belts, and frequent, if not constant, attention is required to maintain such belts properly aligned. It is one of the objects of this invention to obviate the necessity of any hand or manually controlled apparatus and to provide a belt pulley which is automatic and certain in its operation, and which automatically corrects and counteracts a tendency to misalignment.

Another object is to provide self-aligning means which act in response to side movement of the belt out of alignment; automatically to cause reverse side movement of the belt into the position of alignment.

Other objects will appear from time to time throughout the specification and claims.

This invention is illustrated more or less diagrammatically in the accompanying drawings, wherein:

Figure 1 is a plan view of one form of the invention, with parts broken away and parts omitted.

Figure 2 is a transverse section taken at line 2—2 of Figure 1 upon an enlarged scale.

Figure 3 is a view showing the parts of Figure 2, but taken in a horizontal plane at line 3—3 of Figure 6. It shows both ends of the pulley with the parts out of alignment.

Figure 4 is a side elevation with parts broken away and parts omitted, showing the basic parts of the pulley itself.

Figure 5 is a side elevation showing one of the movable aligning parts, showing its inner face.

Figure 6 is a transverse sectional detail taken at line 6—6 of Figure 2. Figure 7 is a transverse sectional detail taken at line 7—7 of Figure 2, looking in the direction of the arrows, with parts omitted and parts broken away.

Figure 8 is a transverse longitudinal section similar to Figure 2 and showing a modified form.

Figure 9 is a transverse section taken at line 9—9 of Figure 8.

Figure 10 is a transverse sectional detail taken at line 10—10 of Figure 8.

Figure 11 is a sectional detail showing a modification in which rubber or similar material is used in place of an anti-friction member such as a ball bearing or the like.

Figure 12 is a sectional detail showing a still further modification in which rubber or similar material is combined with an anti-friction bearing.

Figure 13 is an elevation with parts in section, showing a modified form of the device shown generally in Figs. 1 and 2.

Like parts are indicated by like characters throughout the specification and the drawings.

In the form of the invention illustrated in Figures 1–7, inclusive, the pulley includes a shaft-like member 1 which is rounded at its ends as shown and may be carried in bearings 2—2, which as shown in Figure 2 are provided with bushings 3. The body of the shaft-like member 2 is enlarged and preferably squared in cross-section as at 4, as shown particularly in Figure 6, and it is provided with one or more perforations 5—5, some of which extend straight through in one plane, and others of which extend straight through in a plane at right angles to the first. These perforations serve the purpose that will be explained below. On each of its faces the body portion is provided with one or more grooves 6—6 which serve as ball races and in which ball bearings 7—7 are positioned. For each face there is provided a cage or ball guiding member 8 which is provided with suitable perforations for each of the balls 7. Positioned externally on each of the faces of the member 4 and externally of the ball guiding members 8 is a belt contacting pulley portion 9. These portions are shown particularly in Figure 6, are rounded externally on the arc of a circle and are flat internally; and they are provided with ball races 10 which correspond to the ball races 6 of the member 4 and in which the balls 7 are arranged to fit and to move. As a means for holding the pulley members 9 moveably in position, springs 11 are provided and there is one spring in each of the perforations 5 and preferably at least 2 springs for each pair of pulley members 9. As shown, there are three such springs for each pair, but the number is variable depending upon the size and shape of the pulley members and upon the type of installation in which they are mounted. The springs serve to hold together yieldingly each pair of pulley members 9.

Mounted externally of the pulley is a belt 12, and this belt may be of any size, material, or shape desired. It may be used in an installation in which all of the pulleys are self-aligning, or it may be used as shown in Figure 1 in an installation in which a straight pulley 13 of conventional design is used. As there shown, the pulley 13 is carried by a shaft 14, which is mounted in bearings 15.

In each end of each of the pulley members 9 a ball pocket 16 is formed and a ball bearing 17 is mounted in each such pocket. These bearings abut against a ring or washer 18, of which one is positioned at each end of the self-aligning pulley assembly. Adjacent the ring or washer 18 is a ball carrying disk 19, which is perforated to receive a plurality of ball bearings 20, and these ball bearings are in contact with the flat face 21 of a ring 22, which is provided with a concave opposite face 23. A concave ball carrying member 24 is mounted adjacent the ring 22 and corresponds in shape to its concave face 23. Balls 25 are mounted in the carrier 24. A ring member 26 is fixed on the shaft portions 1 by a set screw 27. It has a convex face 28 which conforms in shape to the concave face 23 of the member 22 and to the concave shape of the member 24, which carries the balls 25. The construction at each end of the pulley is identical.

As shown in the modified forms of Figures 8, 9, and 10, the pulley and bearing construction is generally similar to that described above, and there is the shaft portion 1 carried in bearing housings 2 having bushings 3. The shaft portion is enlarged as at 4 to provide a portion of generally squared cross-section, and is perforated as at 5, and this member is provided with ball races 6, in which balls 7 are mounted and held in place by ball guides or cages 8. Pulley members 9 are provided, and they have ball races 10 in which the balls 7 are received. Instead, however, of the ball bearings 17, mounted in pockets 16, as shown in the form of the first 7 figures, each of the pulley members 9 of the form of Figures 8, 9, and 10 is provided with a cut-away portion 29 within which a roller 30 is positioned, this roller being held in place by a pin 30a positioned in a perforation 30b, in each of the members 9.

The rollers 30 bear against the flat faces 31 of rings 32, which are concave on their opposite faces, as at 33. The faces 33 are in contact with rollers 34, which are mounted by pins 35 in notches or depressions 36 in rings 37, which are threaded on the threaded portions 38 of the shaft 1 and are adjustably held in place by lock nuts 39.

As shown in Figure 11, instead of the balls or races, a cushion member 65 is used. This member has portions 66 and 67 which fit into the corresponding depressions 68 and 69, formed respectively in the shaft portion 4 and the pulley portions 9. These members 65 may be made of rubber or other material having generally similar physical properties and may be vulcanized or otherwise secured in place.

In the form shown in Figure 12, the parts are generally the same, but instead of providing rubber members 65 received in pockets or depressions, rubber members 70 are provided and they are vulcanized or otherwise fastened to the shaft portions 4 and to the pulley portions 9, and roller bearings 71 which may be used in the space between the portions 70. The portions 70 may be separate from each other or they may be formed as blocks in which perforations are formed to receive the bearings 71.

In the modified form of Figure 13, the parts are substantially the same as those shown in the first 7 figures, but instead of using spring members such as the members 11, to hold the parts 9 together, these parts are grooved externally near their ends as at 106, and a spring member 105 fits into the groove. This spring member may be annular in shape and surrounds the pulley and engages all four members 9 to hold them in place. Its outer surface preferably does not extend above the outer surface of the members 9. This fastening member 105 may be a rubber ring or a spring ring, formed of metal, and it might be somewhat like a piston ring, or it might be a coiled ring formed into an annulus. Whatever its shape or material, it surrounds the members 9 and serves as a slight yielding means for binding them together and for holding them in place upon the shaft section 4, but it permits the necessary lateral movement of the members 9 with respect to the section 4. Similarly, the balls 20 and 25 of Figures 2 and 3, for example, may be omitted, and the surfaces of the concave and convex members, if properly formed and properly treated, for example, by suitable hardening, will serve the purpose of the invention without the added ball bearings such as shown in Figure 2. Also springs 11 of Figure 1 might be omitted and different fastenings used. The purpose of the springs 11 is to furnish a fastening for holding members 9 in place and for permitting slight relative movement of these parts with respect to the shaft portion 4, and any fastening which will accomplish this purpose is within the contemplation of this invention.

It will be realized that whereas I have described and shown a practical and operative embodiment of my invention and the method for carrying it out, nevertheless many changes may be made in the size, shape, number and disposition of parts and in the details and steps of such method without departing from the spirit of my invention. I therefore wish my description and drawings to be taken as in a broad sense illustrative or diagrammatic, rather than as limiting me to my precise showing.

The invention in the form shown herewith is applied, among other purposes, to a pulley arranged to operate in connection with a belt, but as pointed out above, the invention is not limited to a pulley and may be applied to any rotary member. It may be applied, therefore, to a pulley, a cylinder, a roller, a wheel, whether it is a driver or is driven, or merely idles. It may be used as a member associated with a belt, a rope, a chain, or a link chain, and these members may be of any shape. It may be associated with a screen or other material used in screening and sifting. When it is applied to textile material, it may be used to carry or drive or otherwise may be associated with a web of textile or other fibrous material, such as a "batt," in which the material to be conveyed contacts the rotary member directly and not through the medium of a conveyor belt, and pulleys or rotary members made according to this invention may be used in connection with the driving of vehicles in which a belt or band-like member is in contact with the ground, and rotary members made according to the present invention are in contact with the belt or band-like member. Where in the specification and claims the word "pulley" has been used, it is to be taken as meaning a rotary member of the type generally indicated, and is not to be limited to a pulley as such. In general, the invention contemplates a rotary member which may be used alone or in connection with means which it contacts and which move with respect to it, whatever the nature or purpose of such means may be.

The use and operation of the invention are as follows:

Considering the pulley of the first 7 figures, we may assume that the parts are initially as shown in Figure 1—that is to say, with the belt properly aligned on the pulley. If now the pulley is driven, or if the belt is caused to move by any other means, the danger of misalignment occurs. Although the pulley is shown in Figure 1 as being driven, it is to be understood that the self-aligning features may be embodied in a pulley which is directly driven, or may be embodied in a pulley which idles. So far as the self-aligning features are concerned, their operation is the same in either case.

Assuming now that the pulleys are rotating and that the belt is moving, misalignment may develop. That condition is shown in Figure 3. The edge of the belt 12 has moved somewhat to the left. In doing so, it has "climbed up" on the left-hand ring 22 and because that ring fits loosely against the member 26, the weight or force of the belt has depressed it, and it is tilted downwardly from the position which it occupied in Figures 1 and 2. Because the member 22 is associated with the convex face 28 of the member 26 when it moves downwardly its upper edge moves to the right and exerts pressure upon the uppermost pulley member 9. This is due to the fact that as the ring 22 is tilted downwardly, its upper portion moves in effect outwardly along the convex 28 and it exerts a right-hand thrust through the balls 20, the disc 18 against the balls 17, and thus forces the outermost pulley member 9 to the right. This thrust is transmitted to the opposite end of the outermost member 9 and forces the upper edge of the corresponding right-hand ring 22 to the right, and when this ring is forced to run upwardly along its convex 28, its lower end moves to the left just as the lower end of the left-hand ring 28 has moved to the left, and thus the innermost pulley member 9 is moved to the left.

As a result of the movement above described, the misalignment of the belt has caused two pulley members to shift axially along the pulley or shaft portion 4, as has the outermost member 9 shifted to the right, as illustrated in Figure 3. Since it is the one against which the greatest load of the belt is pulling, it carries the belt bodily to the right with it, and thus tends to correct the misalignment. This effect is continued or may be continued as the pulley revolves, and should the belt move too far to the right, the same cycle of operations will occur, but with the directions reversed so that the outermost pulley member 9, should the belt move too far to the right, will be forced to the left and will carry the belt back.

In general, the operation of all forms of the device is substantially the same. In each case, the pulley surface which is engaged by the belt is formed of several relatively moveable parts, and these parts are mounted to move axially along the pulley body. Means are provided at each end of the pulley against which or upon which a misaligned belt can exert pressure, and that pressure, when exerted, forces one or more of the relatively moveable pulley members to move to the direction opposite that in which misalignment has taken place.

In the form shown in the first 7 figures, the pulley members 9 are moved when the belt climbs upon either of the rings 22. In the form of Figures 8, 9, and 10, the rings 32 serve the same purpose, and cause the same general action. In these forms of the device, ball bearings or rollers are used in the contacting members, which effect the realignment, but they might be omitted and hardened and properly prepared surfaces would carry out the action even without the assistance of the ball bearings.

It is to be noticed, however, that in all forms of the device, when one pulley member is moved positively to correct alignment, the opposite member is not in contact with the belt. Thus in Figures 3 and 6, when the outermost pulley member 9 is moved by the action of the belt, the innermost member 9 which is opposite to it is not in contact with the belt at all.

I claim:

1. In combination in a self-aligning rotor, a rotor body, a plurality of surface members moveably carried thereby, and forming a contacting surface, and moveable means adjacent said surface members and positioned to have contact with a surface with which the self-aligning rotor is in contact, and to be moved by such surface contact, said moveable means being effective, when moved by contact with said surface, to move in the direction opposite to that of misalignment, and thereby to compensate for said misalignment.

2. In combination in a self-aligning pulley, a pulley member, a plurality of surface members moveably carried thereby, and forming a belt contacting surface, and moveable wedge-like means adjacent the ends of said surface members and positioned to be contacted and moved by a misaligned belt, said moveable means effective, when moved by the belt, to move a surface member in the direction opposite to that of the misalignment, and thereby to compensate for the misalignment.

3. In combination in a self-aligning pulley, a pulley member, a plurality of surface members moveably carried thereby, and forming a belt contacting surface, and fixed and moveable wedge-like means adjacent the ends of said surface members, said movable means being positioned to be contacted and moved by a misaligned belt, said moveable means effective, when moved by the belt, to move a surface member in the direction opposite to that of the misalignment, and thereby to compensate for the misalignment.

4. In combination in a self-aligning pulley, a pulley member, a plurality of surface members moveably carried thereby, and forming a belt contacting surface, and fixed and moveable means adjacent said surface members said movable means positioned to be contacted and moved by a misaligned belt, said moveable means effective, when moved by the belt, to move a surface member in the direction opposite to that of the misalignment, and thereby to compensate for the misalignment.

5. In combination in a self-aligning pulley, a pulley member, a plurality of surface members moveably carried thereby, and forming a belt contacting surface, and moveable means adjacent said surface members and positioned to be contacted and moved by a misaligned belt, said moveable means effective, when moved by the belt, to move a surface member in the direction opposite to that of the misalignment, and thereby to compensate for the misalignment, said surface members being mounted for movement with respect to said pulley member.

6. In combination in a self-aligning pulley, a pulley member, a plurality of surface members moveably carried thereby, and forming a belt contacting surface, and moveable means adjacent said surface members and positioned to be contacted and moved by a misaligned belt, said moveable means effective, when moved by the belt, to move a surface member in the direction opposite to that of the misalignment, and thereby to compensate for the misalignment, said surface members being mounted for movement with respect to said pulley member and provided with yielding means tending to restrain their movement.

7. In combination in a self-aligning pulley, a main pulley member, a plurality of surface members associated therewith, forming a surface for a belt, and means associated with the said surface members positioned adjacent their ends and adapted to be contacted and displaced by the belt, said means comprising a cam member fixed at each end of said pulley, and a cooperating cam member loose upon each end of said pulley and adapted to cooperate with said fixed cam member, and being effective, upon displacement, to move a pulley member by said displacement in the direction opposite that of the misalignment which has occurred.

8. In combination in a self-aligning pulley, a main pulley member, a plurality of surface members associated therewith, forming a surface for a belt, and means associated with the said surface members positioned adjacent their ends and adapted to be contacted and displaced by the belt, said means comprising a cam member fixed at each end of said pulley, and a cooperating cam member loose upon each end of said pulley and adapted to cooperate with said fixed cam member, and being effective, upon displacement, to move a pulley member by said displacement in the direction opposite that of the misalignment which has occurred, said surface members being mounted for axial movement with respect to said pulley member.

9. In combination in a self-aligning pulley, a main pulley member, a plurality of surface members associated therewith, forming a surface for a belt, and means associated with the said surface members positioned adjacent their ends and adapted to be contacted and displaced by the belt, said means comprising a cam member fixed at each end of said pulley, and a cooperating cam member loose upon each end of said pulley and adapted to cooperate with said fixed cam member, and being effective, upon displacement, to move a pulley member by said displacement in the direction opposite that of the misalignment which has occurred, there being loosely mounted contact members positioned between said moveable cam members and the adjacent ends of the surface members.

10. In combination in a self-aligning pulley, a main pulley member, surface members moveably mounted thereon and adapted to provide a surface for a belt, wedge members associated with said pulley, one of them being mounted to be contacted by the belt upon the occurrence of misalignment and to be moved by the belt, and means associated with said wedge means and said surface member whereby movement of the wedge means is transmitted to the surface member to move it in the direction opposite to that in which misalignment has occurred.

11. In combination in a self-aligning pulley, a main pulley member having a body shaped to provide a plurality of axially aligned surfaces, a surface member being moveably mounted on each of said axially aligned surfaces and means tending to hold said surface members in place, and a convex wedge member fixed on each end of said pulley, and a plurality of cooperating concave members positioned loosely on the pulley, one being in contact with each of said fixed convex members, said moveable wedge members positioned to be contacted and moved by a misaligned belt, and effective upon such movement to move a surface member in the direction opposite to that in which misalignment has occurred.

12. In combination in a self-aligning pulley, a main pulley member having a body shaped to provide a plurality of axially aligned surfaces, a surface member being moveably mounted on each of said axially aligned surfaces and yielding means tending to hold said surface members in place, and a convex wedge member fixed on each end of said pulley, and a plurality of cooperating concave members positioned loosely on the pulley, one being in contact with each of said fixed convex members, said moveable wedge members positioned to be contacted and moved by a misaligned belt, and effective upon such movement to move a surface member in the direction opposite to that in which misalignment has occurred.

13. In combination in a self-aligning pulley, a main pulley member having a body shaped to provide a plurality of axially aligned surfaces, a surface member being moveably mounted on each of said axially aligned surfaces and means tending to hold said surface members in place, and a convex wedge member fixed on each end of said pulley, and a plurality of cooperating concave members positioned loosely on the pulley, one being in contact with each of said fixed convex members, and thrust transmitting members positioned loosely on the pulley between each of said moveable wedge members and the adjacent ends of the surface members, and adapted to transmit thrust from said moveable wedge member to a surface member, said moveable wedge members positioned to be contacted and moved by a misaligned belt, and effective upon such movement to move a surface member in the direction opposite to that in which misalignment has occurred.

14. In combination in a self-aligning pulley, a main pulley member having a squared body shaped to provide a plurality of axially aligned surfaces, a surface member being moveably mounted on each of said axially aligned surfaces and means tending to hold said surface members in place, and a convex wedge member fixed on each end of said pulley, and a plurality of cooperating concave members positioned loosely on the pulley, one being in contact with each of said fixed convex members, said moveable wedge members positioned to be contacted and moved by a misaligned belt, and effective upon such movement to move a surface member in the direction opposite to that in which misalignment has occurred.

15. In combination in a self-aligning pulley, a main pulley member having a squared body shaped to provide a plurality of axially aligned surfaces, a surface member being moveably mounted on each of said axially aligned surfaces and means tending to hold said surface members in place, and a convex wedge member fixed on each end of said pulley, and a plurality of cooperating concave members positioned loosely on the pulley, one being in contact with each of said fixed convex members, and thrust transmitting members positioned loosely on the pulley between each of said moveable wedge members and the adjacent ends of the surface members, and adapted to transmit thrust from said moveable wedge member to a surface member, said moveable wedge members positioned to be contacted and moved by a misaligned belt, and effective upon such movement to move a surface member in the direction opposite to that in which misalignment has occurred.

16. In combination in a self-aligning pulley, a main pulley member having a squared body shaped to provide a plurality of axially aligned surfaces, a surface member being moveably mounted on each of said axially aligned surfaces and yielding means tending to hold said surface members in place, and a convex wedge member fixed on each end of said pulley, and a plurality of cooperating concave members positioned loosely on the pulley, one being in contact with each of said fixed convex members, and thrust transmitting members positioned loosely on the pulley between each of said moveable wedge members and the adjacent ends of the surface members, and adapted to transmit thrust from said moveable wedge member to a surface member, said moveable wedge members positioned to be contacted and moved by a misaligned belt, and effective upon such movement to move a surface member in the direction opposite to that in which misalignment has occurred.

17. In combination in a self-aligning pulley, a main pulley member having a body shaped to provide a plurality of axially aligned surfaces, a surface member being moveably mounted on each of said axially aligned surfaces and yielding means tending to hold said surface members in place, said yielding means comprising springs, each spring engaging two surface members, and a convex wedge member fixed on each end of said pulley, and a plurality of cooperating concave members positioned loosely on the pulley, one being in contact with each of said fixed convex members, said moveable wedge members positioned to be contacted and moved by a misaligned belt, and effective upon such movement to move a surface member in the direction opposite to that in which misalignment has occurred.

18. In combination in a self-aligning pulley, a main pulley member having a body shaped to provide a plurality of axially aligned surfaces, a surface member being moveably mounted on each of said axially aligned surfaces and yielding means tending to hold said surface members in place, said yielding means comprising a spring band positioned about and engaging all of said surface members, and a convex wedge member fixed on each end of said pulley, and a plurality of cooperating concave members positioned loosely on the pulley, one being in contact with each of said fixed convex members, said moveable wedge members positioned to be contacted and moved by a misaligned belt, and effective upon such movement to move a surface member in the direction opposite to that in which misalignment has occurred.

19. In combination in a self-aligning pulley, a main pulley member having a body shaped to provide a plurality of axially aligned surfaces, a surface member being moveably mounted on each of said axially aligned surfaces and yielding means tending to hold said surface members in place, said yielding means comprising cushion members secured to a surface member and to the pulley body, and a convex wedge member fixed on each end of said pulley, and a plurality of cooperating concave members positioned loosely on the pulley, one being in contact with each of said fixed convex members, said moveable wedge members positioned to be contacted and moved by a misaligned belt, and effective upon such movement to move a surface member in the direction opposite to that in which misalignment has occurred.

20. In combination in a self-aligning pulley, a main pulley member having a squared body shaped to provide a plurality of axially aligned surfaces, a surface member being moveably mounted on each of said axially aligned surfaces and yielding means tending to hold said surface members in place, and anti-friction means positioned in each end of each surface member, and a convex member fixed on each end of said pulley, and a plurality of cooperating concave members positioned loosely on the pulley, one being in contact with each of said fixed convex members, and thrust transmitting members positioned loosely on the pulley between each of said moveable wedge members and the adjacent ends of the surface members, and adapted to transmit thrust from said moveable wedge member to a surface member, said moveable wedge members positioned to be contacted and moved by a misaligned belt, and effective upon such movement to move a surface member in the direction opposite to that in which misalignment has occurred, there being anti-friction members positioned between said surface members and said pulley body, and also between said concave and said convex wedge members and between each moveable wedge member and the ends of the surface members adjacent to it.

21. In combination in a pulley, a plurality of members adapted to contact a belt, said members being mounted for endwise movement along the pulley, and means for imparting endwise movement to one of said members in one direction in response to endwise movement of another of said members in an opposite direction.

22. In combination in a pulley, a plurality of members adapted to contact a belt, said members being mounted for endwise movement along the pulley, means for moving one of said members endwise in response to misalignment of said belt with respect to said pulley, and means for imparting endwise movement to one of said members in one direction in response to endwise movement of another of said members in an opposite direction.

23. In combination with a belt, a multi-part pulley in contact with said belt, adapted to engage a belt, means for imparting movement to one of said pulley parts, in response to misalignment of said belt, and means for imparting an opposite movement to another part of said pulley in response to movement of said first mentioned part.

24. In combination with a belt, a pulley over which it is adapted to travel including a plurality of separate segments, each longitudinally movable parallel with the pulley axis, means responsive to lateral displacement of the belt out of alignment with the pulley for displacing segments which are out of contact with the belt in the same direction as the belt is displaced and means for moving those segments which are in contact with the belt in a direction tending to move thet belt into alignment with the pulley.

25. In combination with a belt, a pulley over which the belt is adapted to travel, means carried by the pulley adapted to engage the underside of the belt and adapted to laterally move the belt along the face of the pulley, means responsive to misalignment of the belt for moving those means which are out of contact with the belt in the same direction as the belt is displaced, and means for moving those belt engaging means which are in contact with the belt in a direction opposite to the direction of misalignment of the belt.

26. In combination with a belt, a pulley over which it is adapted to travel including a plurality of separate members, each longitudinally movable parallel with the pulley axis, means responsive to lateral displacement of the belt out of alignment with the pulley for displacing members which are out of contact with the belt in the same direction as the belt is displaced and means for moving those members which are in contact with the belt in a direction tending to move the belt into alignment with the pulley.

27. In combination in a pulley, a plurality of members adapted to contact a belt, said members being mounted for endwise movement with respect to the pulley, and means for imparting endwise movement to such members in response to misalignment of a belt with which the pulley is in contact, said means including at each end of the pulley a convex member and a concave member, one of said members positioned to be contacted and moved by a belt with which the pulley is in contact, upon the occurrence of belt misalignment.

28. In combination, in a pulley, a rotatable pulley body, a plurality of belt engaging members on said pulley body, mounted for independent endwise movement, and means for imparting endwise movement to such members in response to misalignment of the belt with which the pulley is in contact, including a pair of cooperating parts at each end of the pulley, each such pair including a circumferential abutment member rotating in unison with the pulley and fixed in relation thereto, and a movable actuating member extending circumferentially about the axis of the pulley and movable in relation to the pulley and to the abutment member, and having portions opposed to the abutment member and to the ends of the belt engaging members.

29. In combination, in a pulley, a rotatable pulley body, a plurality of belt engaging members on said pulley body, mounted for independent endwise movement, and means for imparting endwise movement to such members in response to misalignment of the belt with which the pulley is in contact, including a pair of cooperating parts at each end of the pulley, each such pair including a circumferential abutment member rotating in unison with the pulley and fixed in relation thereto, and a movable annular actuating member extending circumferentially about the axis of the pulley and movable in relation to the pulley and to the abutment member, and having portions opposed to the abutment member and to the ends of the belt engaging members, said annular actuating member being free to move transversely of the axis of the pulley.

RUDOLPH F. HLAVATY.